US005697704A

United States Patent [19]
Coyle

[11] Patent Number: 5,697,704
[45] Date of Patent: Dec. 16, 1997

[54] METHOD AND APPARATUS FOR SEPARATING CLUMPS OF DRIED FRUIT

[75] Inventor: William E. Coyle, Fresno, Calif.

[73] Assignee: Sun-Maid Growers of California, Kingsburg, Calif.

[21] Appl. No.: 676,873

[22] Filed: Jul. 3, 1996

[51] Int. Cl.⁶ .................... B01F 7/04; B07B 13/16; A23P 1/00
[52] U.S. Cl. .............. 366/301; 366/303; 366/325.2; 366/348; 366/349; 99/646 R; 209/3
[58] Field of Search .................. 366/241, 279, 366/292, 302, 303, 301, 325.2, 348, 349; 221/163, 168, 167, 200, 203, 272; 209/3, 236, 235, 240, 243; 99/646 R

[56] References Cited

U.S. PATENT DOCUMENTS

| | | | |
|---|---|---|---|
| 44,785 | 10/1864 | Conkling | 209/236 |
| 2,283,008 | 5/1942 | Le Bar et al. | 366/301 |
| 3,778,032 | 12/1973 | Milling | 366/301 |
| 3,933,086 | 1/1976 | Standing | 99/646 R |
| 4,288,314 | 9/1981 | Derderian | 203/3 |

Primary Examiner—Tony G. Soohoo
Attorney, Agent, or Firm—Townsend and Townsend and Crew LLP

[57] ABSTRACT

Clumps of dried fruit are separated into individual fruit pieces with reduced damage to the fruit itself by passing the clumps through an apparatus containing a rotating shaft from which robber-like resilient fingers protrude. As they rotate, the fingers pass between other fingers in the apparatus, and the combination exerts a force on the dried fruit clumps that varies with the degree of deflection of the fingers and hence with the sizes and resistances of the clumps.

13 Claims, 2 Drawing Sheets

METHOD AND APPARATUS FOR SEPARATING CLUMPS OF DRIED FRUIT

This invention lies in the field of dried fruits, and particularly the processing of dried fruits prior to packaging or use.

BACKGROUND AND SUMMARY OF THE INVENTION

Dried fruits such as raisins, dried cranberries, prunes, and dried whole or diced apricots, apples, peaches, and dates, often require storage in large quantities prior to their final packaging for consumer use. Under normal storage conditions, the dried fruit tends to aggregate into clumps or clusters of several individual pieces, held together by fruit sugars that adhere to the surfaces of the fruits. Mechanized methods currently used for separating the clumps into individual fruit pieces generally use parallel rotating shafts with metal rods extending outward from the shaft axes. As they pass over and between the shafts, the clumps are penetrated by the rods from both sides and thereby separated.

While the metal rods on these devices consistently reduce the clump size, they do so at the cost of ruining a significant proportion of the dried fruit. Thus, instead of merely separating the clumps into individual fruit pieces, the metal fingers damage the fruit skins causing the bleeding of further fruit sugars from the fruit interiors, and they mash the fruit into smeared fruit paste. The release of wet sugars and paste not only damage the fruit pieces they are released from; they also cause other fruit pieces to reagglomerate in the downstream process flow.

The present invention resides in the use of one or more rotating shafts with protrusions or fingers of resilient or rubber-like material whose resilient force increases with the degree of deflection. When these resilient fingers encounter a clump that is strongly adhering together, the resistance of the clump causes the fingers to deflect to a large degree and to exert a relatively large force on the clump. When they encounter a small clump, or one that is held together relatively loosely, the deflection caused by contact with the clump is less, and the counterforce is likewise less. Thus, the only force exerted on a particular clump is the force needed to break up the clump. The rotating shafts cause the fingers to mesh with additional fingers in the apparatus, that are either mounted on separate rotating shafts or extending from the wall of the channel in which the rotating shaft is mounted, and the spacing between the meshed fingers is selected to accommodate the size of the individual fruit or fruit piece that is being separated. The overall result of the invention is a declumping apparatus that has a lower rate of destruction of the fruit pieces and a higher yield of separated but intact pieces of dried fruit.

These and other features and advantages of the invention are further explained in the description that follows.

DETAILED DESCRIPTION OF THE INVENTION AND PREFERRED EMBODIMENTS

Figure 1:
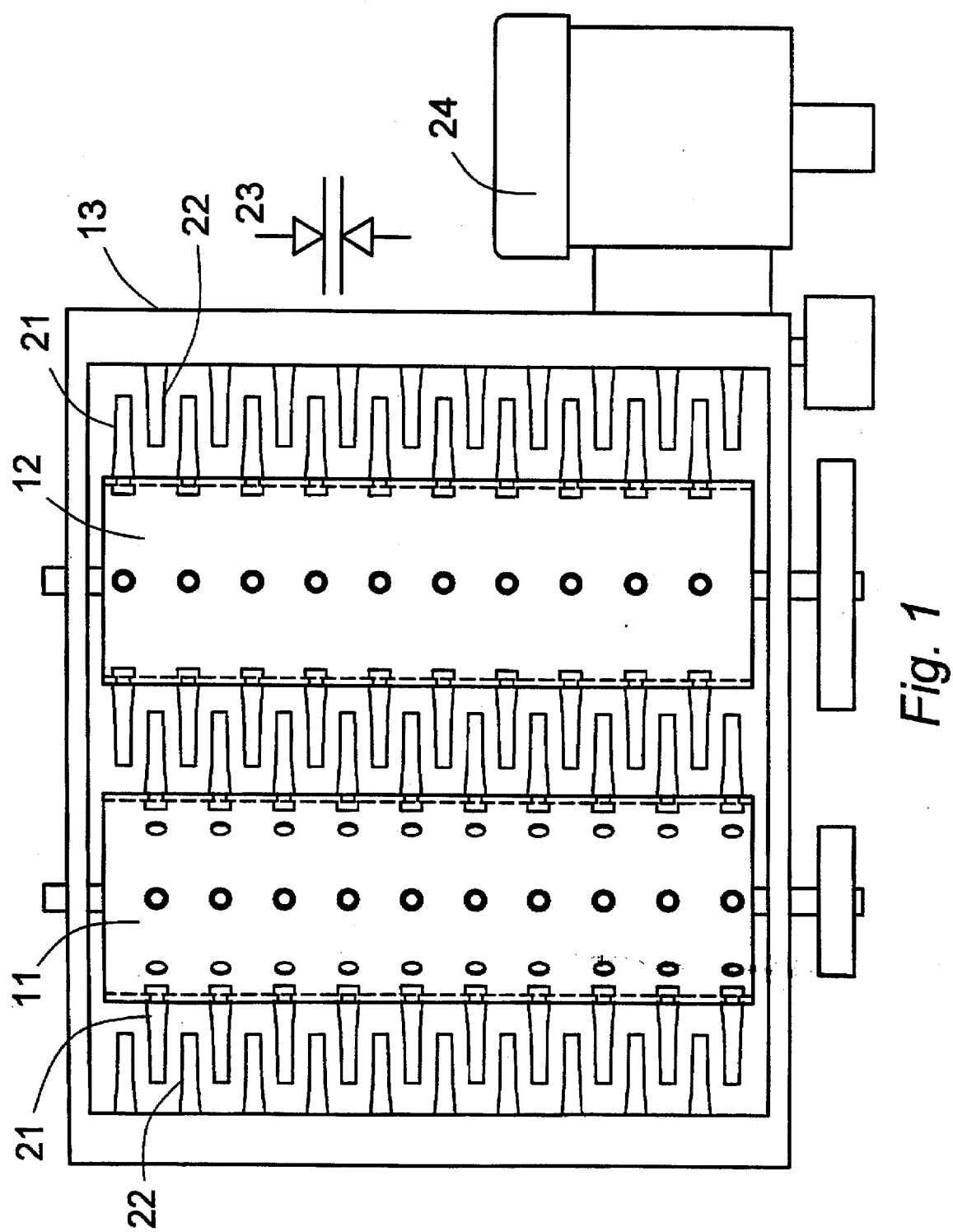
FIG. 1 is a plan view of one example of a declumping apparatus in accordance with the present invention.

While the invention is susceptible to a wide range of embodiments and implementations, it will be best be understood by a detailed description of a specific example. One such example is shown in the drawings and described below.

Figure 2:
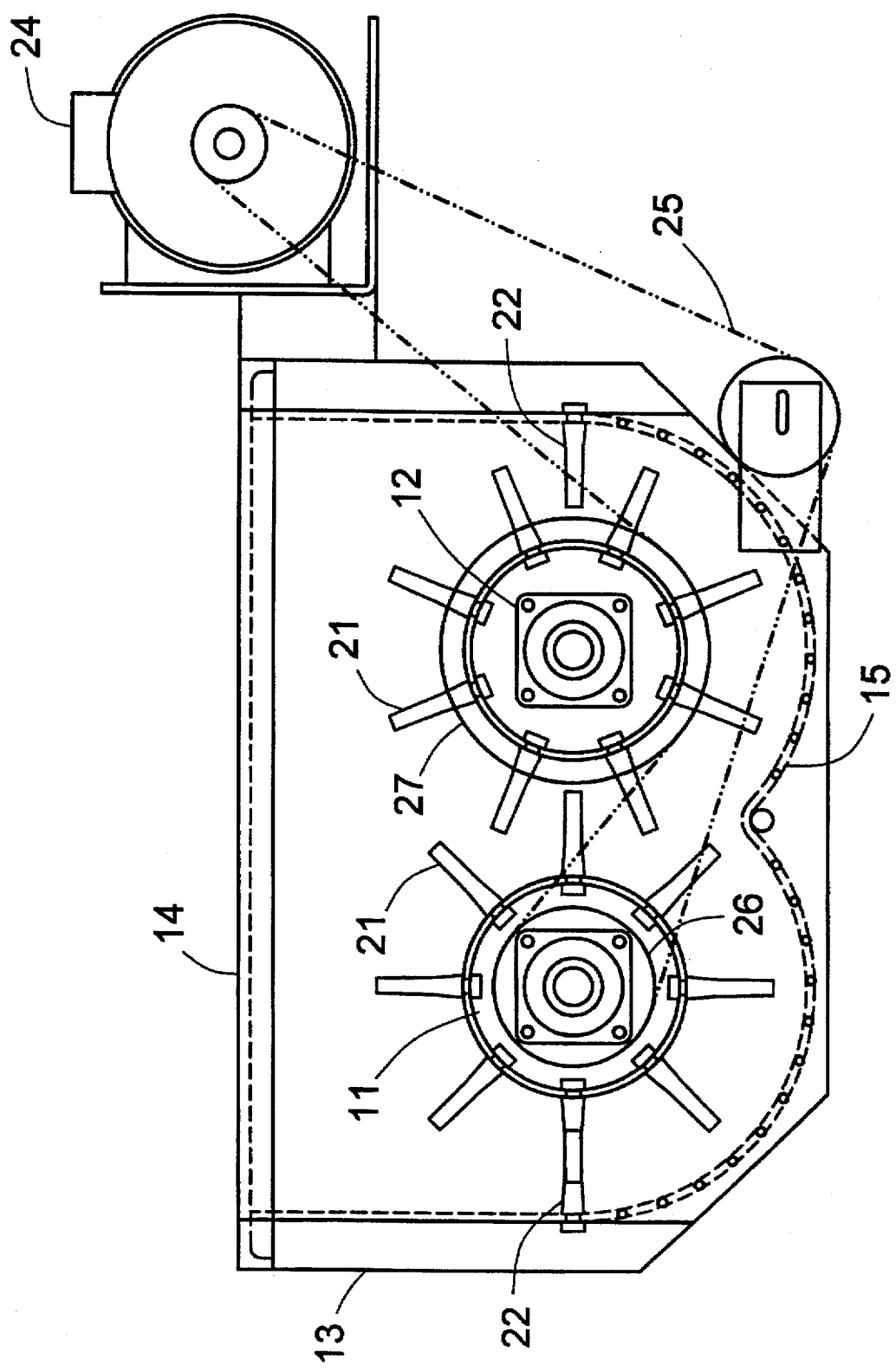
FIG. 2 is an end view of the apparatus of FIG. 1.

As shown in both the plan view of FIG. 1 and the end view of FIG. 2, the declumping apparatus contains two rotating shafts or drums 11, 12 mounted in parallel fashion in a housing 13 that forms a flow-through channel. The housing is open at the top 14 to permit entry of clumped dried fruit, and closed off at the bottom by a screen or barrier 15 that permits individual pieces of dried fruit to pass.

In its broadest sense, the invention resides in the combination of the resilient fingers on one rotating drum or shaft with resilient fingers otherwise mounted on the interior of the housing or on another rotating or otherwise moving element mounted in the housing interior, the additional set of fingers being either stationary or movable. Thus, the housing may contain a single rotating drum, or two, three or more rotating drums, and the additional set of fingers can be either on adjacent rotating drums or on the internal wall of the housing or both. In the embodiment shown in the drawings, rubber fingers 21 protrude from the outer surface of each drum, and further rubber fingers 22 are affixed to the interior wall of the housing.

The fingers on the drum(s) can be arranged in a random arrangement or in any geometrical pattern such that the spacing between adjacent fingers will prevent clumps of dried fruit from falling as intact clumps past the drum(s). In the embodiment shown in the drawings, the fingers 21 on the drums all extend radially outward from the drum axis, and are arranged in straight horizontal rows. The fingers within each row are evenly spaced, as are the stationary fingers 22 mounted on both sides of the interior wall of the housing. The fingers on each drum are further arranged to alternate with (i.e., extend into the spaces between) the fingers on the adjacent drum and alternate with (extend between) the fingers 22 on the housing wall. The closest spacing or gap 23 between the adjacent fingers as the fingers on one rotating drum rotate past the stationary fingers or past the fingers on the other rotating drum is sufficient to permit individual fruit pieces to pass. This gap can vary widely depending on the fruit; a typical range is from about 0.1 inch to about 1.0 inches (0.25 cm to 2.54 cm). For raisins, a typical gap between the side of a finger on one drum and the side of a finger on the other or on the housing wall is about 0.35 inches (0.9 cm).

A simple drive mechanism for the rotation of the shafts is shown in FIG. 2. The mechanism consists of an electric motor 24 in combination with a drive belt 25. The drive belt in this embodiment engages the ends of the both drums, in a manner that will cause the drums to rotate in opposite directions. The invention is also applicable to adjacent drums rotating in the same direction, and it will be readily apparent to those skilled in the art of drive belts how to select a belt arrangement for same direction rotation. Opposing directions are preferred, however, and the motor 24 can be operated in both forward and reverse, thereby causing the drums to rotate either toward each other (from an upper perspective) or away from each other. In general, rotation toward each other will exert a high torque on the clumped fruit, and is best performed at a low rotation speed on fruit that are highly resistant to declumping. Rotation of the drums away from each other can be performed at a higher speed, and will be suitable for clumps of smaller size and less adherence. Outwardly directed, higher speed rotation will also produce a higher throughput rate of fruit pieces.

The shafts can rotate at the same rotation rate (revolutions per minute) or at different rotation rates. In the embodiment shown in the drawings, the belt contact surface 26 on the left drum 11 has a smaller diameter than the belt contact surface 27 on the right drum 12. This causes the drums to rotate at different rotation rates, which adds a further means of promoting declumping of the fruit pieces. While the rotation rates of the drums and the speeds (linear velocities) of the tips of the fingers can vary considerably and are not critical to the invention, best results are generally achieved with finger tip speeds within the range of about 50 to about 500 feet per minute (25.4 to 254 cm per second), and preferably from about 100 to about 300 feet per minute (50.8 to 152.4 cm per second). When different tip speeds are used, the differential can vary widely. In most applications, the differential will range from about 1 foot per minute to about 30 feet per minute. In one presently preferred application, the two drums rotate at finger tip speeds of 196 feet per minute (99.6 cm/sec) and 190 feet per minute (96.5 cm/sec). The drum rotation rates are accordingly calculated based on the drum diameters. For drum diameters of 8 inches (20.3 cm) and extended finger lengths of 3.4 inches (8.7 cm), the drum rotation rate corresponding to 196 feet per minute is 51 revolutions per minute, and the drum rotation rate corresponding to 190 feet per minute is 49 revolutions per minute.

The fingers can be formed of any material that has a rubber-like resiliency. Natural or synthetic rubbers may be used; examples are polyisoprene, neoprene, butadiene-styrene copolymers, acrylonitrilebutadiene copolymers (nitrile rubber), ethylenepropylene diene (EPDM) rubbers, butyl rubber, polyacrylonitrile ("Hycar") silicone rubbers, and polyurethane. Rubbers of varying degrees of hardness can be used, and the fingers can also be shaped to affect their resiliency, by incorporating ridges or grooves to increase bulk or add flexibility. A .typical hardness range for this invention is 60 to 110 on the Durometer hardness scale. Fingers of these types are readily available from suppliers for incorporation into machinery for such uses as plucking chickens and vibrating nut trees to release nuts.

The barrier 15 located underneath the rotating drums contains openings large enough to permit individual fruit pieces to pass easily while retaining large clumps that have passed through the fingers. The clumps landing on the barrier will be contacted and massaged by the fingers passing over them. This will separate the clumps into individual pieces and once separated, they will fall through the openings in the barrier. For raisins, a typical barrier might have openings 1 inch (2.54 cm) square. Selection of the opening size for other fruits will be readily apparent to anyone skilled in the art.

The apparatus and method of this invention are useful in declumping dried fruits in general, including dried fruits that have been diced or otherwise cut into pieces. Examples are those fruits indicated above—i.e. , raisins, dried cranberries, prunes, and dried whole or diced apricots, apples, peaches, and dates.

The foregoing is offered primarily for purposes of illustration. It will be readily apparent to those skilled in the art that the components of the apparatus, their dimensions and the materials used for their constructions, as well as their method of use and other parameters of the invention can be further modified or substituted in various ways without departing from the spirit and scope of the invention.

I claim:

1. A method for separating clumps of dried fruit pieces into individual pieces, comprising dropping said clumps through a vertical channel having a first set of horizontally spaced elongated protrusions therein of resilient material, while rotating a horizontal shaft in said channel, said horizontal shaft containing a second set of horizontally spaced elongated protrusions of resilient material, to cause said elongated protrusions of said second set to pass between said elongated protrusions of said first set, the spacings of all of said protrusions being selected to permit passage of substantially only individual pieces of said dried fruit through said channel, and said resilient material being sufficiently flexible to be deflected by said clumps and to exert a force on said clumps of increasing magnitude with increasing degrees of deflection.

2. A method in accordance with claim 1 in which said first set of elongated protrusions are fixedly mounted to the interior of said channel.

3. A method in accordance with claim 1 in which said horizontal shaft is defined as a first horizontal shaft, and said channel further contains a second horizontal shaft parallel to the first, said second set of elongated protrusions extending from said second horizontal shaft and said method comprising rotating said first and second horizontal shafts simultaneously.

4. A method in accordance with claim 3 in which said channel further contains a third set of elongated protrusions of resilient material fixedly mounted to the interior of said channel.

5. A method in accordance with claim 3 comprising rotating said first and second horizontal shafts in opposite directions.

6. A method in accordance with claim 5 comprising rotating said first and second horizontal shafts toward each other from an upper perspective.

7. A method in accordance with claim 5 comprising rotating said first and second horizontal shafts away from each other from an upper perspective.

8. A method in accordance with claim 3 in which said first and second sets of elongated protrusions each form a series of axial rows on said first and second horizontal shafts, respectively, said rows being evenly spaced from each other and the protrusions in each row being evenly spaced from each other, said method comprising rotating said shafts in opposite directions with rows on one shaft passing between rows on the other.

9. Apparatus for separating clumps of dried fruit pieces into individual pieces, comprising:

a vertical flow-through channel with a horizontal shaft rotatably mounted therein;

a first set of horizontally spaced elongated protrusions of resilient material extending into said channel;

a second set of horizontally spaced elongated protrusions of resilient material extending from said horizontal shaft; and means for rotating said horizontal shaft inside said channel;

the spacings of all of said protrusions being selected to permit passage of substantially only individual pieces of said dried fruit through said channel, and said resilient material being sufficiently flexible to be deflected by said clumps and to exert a force on said clumps of increasing magnitude with increasing degrees of deflection.

10. Apparatus in accordance with claim 9 in which said first set of elongated protrusions are fixedly mounted to an interior wall of said channel.

11. Apparatus in accordance with claim 9 in which said horizontal shaft is defined as a first horizontal shaft, and said channel further contains a second horizontal shaft parallel to the first, said second set of elongated protrusions extending from said second horizontal shaft.

12. Apparatus in accordance with claim 11 in which said channel further contains a third set of elongated protrusions of resilient material fixedly mounted to the interior of said channel.

13. Apparatus in accordance with claim 9 further comprising a barrier across said channel below said horizontal shaft and all of said protrusions, said barrier having openings therein to permit passage of individual dried fruit pieces.

* * * * *